US011275782B2

(12) United States Patent
Kurian

(10) Patent No.: US 11,275,782 B2
(45) Date of Patent: Mar. 15, 2022

(54) DIGITAL SYSTEMS AND METHODS FOR A CONSOLIDATED TRANSFER MATRIX

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 508 days.

(21) Appl. No.: 16/414,881

(22) Filed: May 17, 2019

(65) Prior Publication Data

US 2020/0364267 A1 Nov. 19, 2020

(51) Int. Cl.
| | | |
|---|---|---|
| *G06F 16/90* | (2019.01) | |
| *G06F 16/901* | (2019.01) | |
| *G06K 9/62* | (2022.01) | |
| *H04L 9/06* | (2006.01) | |
| *G06F 16/903* | (2019.01) | |

(52) U.S. Cl.
CPC .... *G06F 16/9024* (2019.01); *G06F 16/90335* (2019.01); *G06K 9/6224* (2013.01); *H04L 9/0637* (2013.01)

(58) Field of Classification Search
None
See application file for complete search history.

(56) References Cited

U.S. PATENT DOCUMENTS

| | | |
|---|---|---|
| 6,850,900 B1 | 2/2005 | Hare et al. |
| 7,437,327 B2 | 10/2008 | Lam et al. |
| 7,451,107 B1 | 11/2008 | Chvala et al. |
| 7,895,122 B2 | 2/2011 | Flitcroft et al. |
| 8,046,265 B2 | 10/2011 | Van Luchene et al. |
| 8,244,625 B2 | 8/2012 | Holm et al. |
| 8,447,641 B1 | 5/2013 | Kaza et al. |
| 8,484,129 B2 | 7/2013 | Holm et al. |
| 8,744,960 B2 | 6/2014 | Lister |
| 2010/0030675 A1 | 2/2010 | Hanan et al. |
| 2010/0088206 A1* | 4/2010 | Lister .................... G06Q 20/10 705/34 |
| 2010/0329120 A1* | 12/2010 | Zhang .................. H04L 45/128 370/238 |
| 2016/0261690 A1* | 9/2016 | Ford ................... H04L 41/0806 |
| 2017/0364873 A1 | 12/2017 | Turk et al. |

* cited by examiner

*Primary Examiner* — Belix M Ortiz Ditren
(74) *Attorney, Agent, or Firm* — Weiss & Arons LLP

(57) ABSTRACT

Systems and methods for providing a consolidated transfer ecosystem are provided. Systems may include a graph database. The graph database may include a plurality of nodes representing a plurality of entities. The system may receive a plurality of transfer requests and represent each transfer request as an edge on the graph database. The system may include a consolidation engine that may consolidate the edges in the graph database to produce a consolidated database. The system may execute the transfers according to the consolidated database.

20 Claims, 7 Drawing Sheets

DIGITAL SYSTEMS AND METHODS FOR A CONSOLIDATED TRANSFER MATRIX

FIELD OF TECHNOLOGY

Aspects of the disclosure relate to digital systems. Specifically, aspects of the disclosure relate to digital systems for routing and executing network transfer flows.

BACKGROUND OF THE DISCLOSURE

Many entities, large and small, participate in digital transfers. Digital transfers may include data transfers, digitally-initiated and/or digitally-controlled transfers of goods, digital financial transfers, and other suitable transfers linked to the digital realm.

Digital transfers may be associated with costs. The costs may include resource costs. The resource costs may include infrastructure, energy, processing, memory, bandwidth, latency, and other applicable resource costs. The resource costs may also be associated with a financial cost.

The resource costs for each individual digital transfer may, in some scenarios, be relatively small. However, even when the individual costs may be small, the tremendous scale with which digital transfers are deployed may generate aggregate costs that are quite high.

It would be desirable, therefore, to provide computer-based systems and methods for providing a transfer ecosystem that increases efficiency, and, concomitantly, reduces the costs, of digital transfers among a network of entities.

SUMMARY OF THE DISCLOSURE

Aspects of the disclosure relate to a computer-based method for providing a consolidated transfer matrix. The method may include creating a plurality of nodes in a graph database that is stored in a computer memory. Each node may correspond to one of a plurality of entities.

The method may include receiving a transfer request. The transfer request may include a sender entity, a recipient entity, and an amount. The method may also include creating an edge in the graph database corresponding to the transfer request. The edge may connect a first node to a second node. The first node may correspond to the sender entity and the second node may correspond to the recipient entity. The edge may also be associated with the amount.

The method may include receiving one or more additional transfer requests. The method may include creating another edge in the graph database for each of the additional transfer requests.

The method may include traversing and consolidating the graph database. The consolidating may include replacing a series of edges that form a multi-hop path with a set of replacement edges associated with fewer hops than the multi-hop path. The method may also include executing one or more transfers according to the consolidated graph database.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
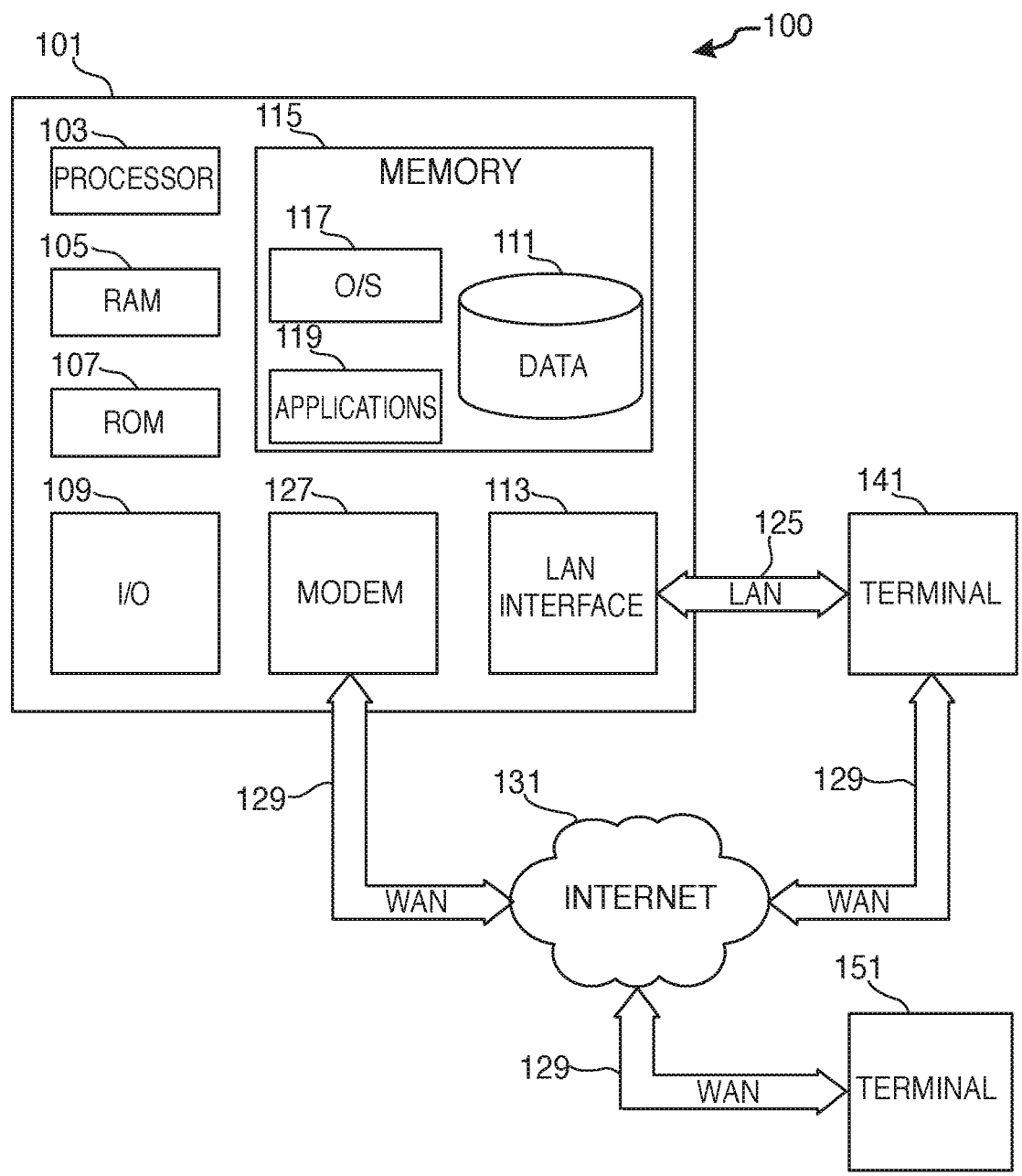
FIG. 1 shows an illustrative system in accordance with principles of the disclosure.

A computer-based method for providing a consolidated transfer matrix is provided. The method may include creating a plurality of nodes in a graph database that is stored in a computer memory. A graph database may be a database that contains elements called nodes, and elements called edges which connect the nodes. Each edge may define a connection between two nodes, and may also define a direction for the connection.

Each node in the graph database may correspond to one of a plurality of entities. The plurality of entities may include individuals, organizations, corporations, and any other suitable entity that may engage in digital transfers. The plurality of entities may be part of a network of entities. For example, the plurality of entities may comprise a group of customers, or clients, of an umbrella entity. The umbrella entity, e.g., a financial institution, may facilitate, audit, or otherwise be involved, at least in part, in the digital transfers.

The method may include receiving a transfer request. The transfer request may include a sender entity, a recipient entity, and an amount. For example, a transfer request may indicate that entity A is requested to send $1000 to entity B. This transfer request may, in certain scenarios, mirror another transfer request that indicates that entity B is requested to send 100 units of a certain item to entity A.

The method may also include creating an edge in the graph database corresponding to the transfer request. The edge may connect a first node to a second node. The first node may correspond to the sender entity and the second node may correspond to the recipient entity. The edge may also be associated with the amount.

The method may include receiving one or more additional transfer requests. The method may include creating another edge in the graph database for each of the additional transfer requests. The graph database may thereby embody a graphical representation of the network of entities, as well as the connections between the entities that are formed by the transfer requests.

The method may include traversing and consolidating the graph database. The consolidating may include replacing a series of edges with a set of replacement edges. The series of edges may form a multi-hop path. The set of replacement edges may be associated with fewer hops than the multi-hop path of the series of edges. A hop may be defined herein as a link, or connection, between two nodes. Thus, each edge may correspond to one hop. A multi-hop path may be a series of links that forms a path—i.e., a chain of connections from one node, to a second, to a third, etc.

For example, a graph database may include an Edge 1 that connects a Node A to a Node B, an Edge 2 that connects Node B to a Node C, and an Edge 3 that connects Node C to a Node D. Edges 1, 2, and 3 may therefore be a series of edges that form a multi-hop path. Consolidating the graph database may include replacing Edges 1, 2, and 3 with a new Edge 4 that connects Node A directly to Node C.

In some embodiments, replacing the series of edges with the set of replacement edges may only be executed when the amounts (i.e., the transfer amount received with each transfer request) associated with each edge of the series of edges are equivalent. When the amounts are equivalent, the set of replacement edges may also be associated with the same amount. For example, in the scenario presented in the previous paragraph, if the amounts associated with Edges 1, 2, and 3 of the series of edges are each $1000, the consolidation may replace the series of edges with Edge 4 connecting Node A to Node C with an amount of $1000.

The method may also include executing one or more transfers according to the consolidated graph database. For example, in the scenario presented above, if the amounts associated with Edges 1, 2, and 3 of the series of edges are each $1000, and the consolidation replaces the series of edges with Edge 4 connecting Node A to Node C with an amount of $1000, the method may include executing a transfer of $1000 from the entity represented by Node A to the entity represented by Node C. Executing the transfers based on the consolidated database may reduce resource costs. The resource costs may be reduced by achieving the same net transfer flow with fewer actual transfers. This may reduce delay, power consumption, processing utilization, memory utilization, bandwidth utilization, and/or any other applicable resources associated with digital transmissions.

Multiple scenarios may present themselves in the consolidation process. In some scenarios, the multi-hop path of the series of edges may connect one node, e.g., node A, to a different node, e.g., node B (e.g., via A to D, D to M, M to F, F to B). In these scenarios, the consolidating may include replacing the series of edges with a set of replacement edges, and the set of replacement edges may include a single edge that connects the node A to the node B.

In other scenarios, the multi-hop path of the series of edges may connect a node, e.g., node C, back to the same node C (e.g., C to X, X to Y, Y to Z, and Z to C). In these scenarios, the consolidating may include replacing the series of edges with the set of replacement edges, and the set of replacement edges may include a result obtained by a difference function applied to the series of edges.

The difference function may be any suitable function for determining a net balance of the transfers represented by the series of edges. For example, if the series of edges includes an Edge 1 connecting Node A to Node B with an amount of $100, and an Edge 2 connecting Node B to Node A with an amount of $75, the difference function may subtract the $75 from the $100 to yield a result of $25 in the direction from A to B. The set of replacement edges may therefore include a single edge connecting Node A to Node B and associated with an amount of $25. If, however, the result is below a predetermined threshold amount, the set of replacement edges may reduce to a null set. For example, if Edge 1 and Edge 2 are both $100, and the result of the difference function is $0, Edges 1 and 2 may cancel out, and the set of replacement edges may be a null set.

In some embodiments of the method, the plurality of entities may include a mesh of trusted entities. A mesh of trusted entities may include a network of entities wherein each entity has achieved a level of trust vis-à-vis some or all other entities in the network. A level of trust may be achieved implicitly—for instance, when two entities successfully transact with each other. A level of trust may also, in certain embodiments, be achieved explicitly—for example, if an entity determines (e.g., based on research or other due diligence) and/or indicates that another entity is deserving of a level of trust. A level of trust may include an indication that an entity is willing to transact with another entity. In some embodiments, levels of trust may be transitive—i.e., if entity A trusts entity B, and entity B trusts entity C, then entity A may trust entity C.

In certain embodiments, the method may include compiling the plurality of entities from a master list of entities. The master list may be a list of clients/customers of an umbrella entity such as a financial institution. Compiling the plurality of entities from the list may include selecting entities based on certain criteria, such as a group of entities that form a mesh of trusted entities. In certain embodiments, the compiling may be executed via an artificial intelligence ("AI") module. The AI module may leverage AI techniques to analyze historical data about the entities (e.g., past transactions), and other suitable information, such as current events, for the compilation.

In some embodiments, the method may further include associating each transfer request with a time window. A time window may be a maximum time lapse from the time of the request or a time by which the transfer should be executed. The consolidating may further include adhering to the time window when replacing the series of edges with the set of replacement edges. For example, if Edge 1 connects Node A to Node B and has a time window that terminates on January 1, and Edge 2 connects Node B to Node C with a time window that terminates on February 1, the system may be able to consolidate the series of edges (i.e., Edges 1 and 2) by replacing the series of edges with an Edge 3 connecting Node A to Node C. Edge 3 may be associated with a time window that terminates on February 1, since the entity of Node C does not need the transfer until then. This may alleviate a time-pressure from the entity of Node A, which now has more time to execute the transfer.

However, if Edge 1 has a time window that terminates on February 1, and Edge 2 has a time window that terminates on January 1, the system may be unable to consolidate and replace the series of edges with an Edge 3 connecting Node A to Node C. The system may be unable to make the replacement because the transfer of Edge 1 has a later deadline (February), and therefore the entity represented by Node A need not be ready to execute the transfer until February. However, if the replacement is done, the entity of Node A may have to execute the transfer to Node C by the time window of Edge 2, which is earlier, in January.

Since adhering to the time windows may, in certain scenarios, limit the options for consolidation, the method may further include associating the time window with an incentive value. An incentive value may be in the form of a monetary incentive, a discount in processing fees, or any other suitable incentive that may incentivize an entity to extend, or enlarge, the time window. The receiving entity may be the entity that determines the time window, and may also be the entity that receives the incentive for extending the time window. For example, referring to the scenario of the previous paragraph, the entity of Node C may be offered an incentive to extend termination of the time window of Edge 2 from January 1 to February 1. Extending the time window may enable consolidation of the series of edges, and, by extension, reduce the resource cost of the system.

The amount of the incentive value may, in certain embodiments, be based at least in part on the size of the time window. For example, the system may offer an entity a larger incentive if an entity selects or consents to a larger (i.e., later) time window. A larger time window may enable more opportunities for consolidation in the system.

In some embodiments of the method, the consolidating may be invisible to the plurality of entities. For example, each entity that schedules a transfer may receive an acknowledgment or notification that the transfer was successful, without details of any consolidations. This may be preferred by the entities, who may have expressed interest in a streamlined transfer process without being bogged down by the details of precisely how the transfer was implemented.

In certain embodiments of the method, the graph database may be implemented as a distributed ledger. In a distributed ledger, multiple copies of the graph database may be stored separately on multiple computing devices. For example, the distributed ledger may be a blockchain database. The blockchain database may include a plurality of coordinated (i.e., synced via consensus) databases. Each coordinated database may be stored on a distinct blockchain node (i.e., a computing device that authenticates and stores a copy of the coordinated database) from a plurality of blockchain nodes. Each coordinated database may include linked blocks of hashed data. A block that is linked to a previous block may include a hashing of the hashed data of the previous block. In certain embodiments, the data may be encrypted. In other embodiments, the data may not be hashed or encrypted.

The blockchain may be a public blockchain. A public blockchain may be a blockchain in which anyone can participate. The blockchain may be private. A private blockchain may be a blockchain in which write permissions are kept to one entity, while read permissions may be public or restricted to certain participants. In certain preferred embodiments, the blockchain may be semi-private. A semi-private blockchain may be run by a single entity, and the single entity may grant access to other qualifying entities.

In some embodiments, the plurality of blockchain nodes may include a plurality of computer systems associated with the plurality of entities. Transfer requests may therefore be entered and/or authenticated directly by the entities, and transfer consolidations and executions may be computed and/or cross-authenticated by the plurality of entities themselves.

A computer system for providing a consolidated transfer matrix is provided. The system may include a graph database stored in a memory unit. The graph database may include a plurality of nodes. Each node may correspond to one of a plurality of entities. The graph database may also include a plurality of edges. Each edge may connect a first node to a second node. Each edge may correspond to a transfer request. A transfer request may be a request received by the system that includes an amount, a sending entity, and a receiving entity. The sending entity may corresponds to the first node, and the receiving entity may correspond to the second node.

The system may also include a consolidation engine. The consolidation engine may include computer code running on a processor. The consolidation engine may be configured to traverse the graph database. Traversing the graph database may include accessing every edge in the graph. The traversing may include analyzing the edges for certain patterns, such as edges that link with each other to form a series of edges.

The consolidation engine may be configured to consolidate the graph database. Consolidating the graph database may include replacing a series of edges that form a multi-hop path with a set of replacement edges associated with fewer hops than the multi-hop path. The system may also be configured to execute one or more transfers according to the consolidated graph database.

The consolidation may follow one or more general templates. One template may be followed when the multi-hop path of the series of edges connects a node A to a node B. In this scenario, the consolidation engine may be configured to replace the series of edges with the set of replacement edges, and the set of replacement edges comprises a single edge that connects the node A to the node B.

Another consolidation template may be followed when the multi-hop path of the series of edges connects a node C back to the same node C. In this scenario, the consolidation engine may be configured to replace the series of edges with the set of replacement edges, and the set of replacement edges may include a result of a difference function applied to the series of edges. The difference function may be designed to produce a net transfer from the series of edges. For example, the difference function may subtract the amount associated with the edge leaving Node C from the amount of the edge leading into Node C. The result may be the net transfer flow, and the replacement edge may be assigned the amount of the result. When the result is below a predetermined threshold amount, e.g., if the series of edges nets out to zero (or 1 cent, or $1, or any other suitable threshold predetermined by the system), the series of edges may cancel out, and the set of replacement edges may reduce to a null set.

In some embodiments of the system, each transfer request may be associated with a time window. The consolidation engine may be further configured to adhere to the time window when replacing the series of edges with the set of replacement edges. The consolidation engine may also be configured to associate the time window with an incentive value. The amount of the incentive value may be based at least in part on the size of the time window.

In certain embodiments of the system, the graph database may be implemented as a distributed ledger. The distributed ledger may include a plurality of blockchain nodes. The plurality of blockchain nodes may include a plurality of computer systems associated with the plurality of entities.

A computer-based method for providing a consolidated transfer matrix is provided. The method may include storing a plurality of entities in a database. The database may be implemented as a distributed ledger. The distributed ledger may include a plurality of blockchain nodes, and the plurality of blockchain nodes may include a plurality of computer systems associated with the plurality of entities.

The method may include receiving a transfer request. The transfer request may include a sender entity, a recipient entity, and an amount. The method may include storing the transfer request as a link in the database. A link may be any suitable entry or data structure that represents the information of the transfer request. The link may also actually connect the sender and recipient entities within the database.

The method may include receiving one or more additional transfer requests. The method may include storing the additional transfer requests as additional links in the database. The database may thus represent the entities, and the relationships between the entities formed by the transfer requests.

The method may include consolidating the database. Consolidating the database may include replacing a series of chained links (i.e., a series of links that form a multi-hop path—e.g., entity A to entity B, B to C, C to X, X to Y, etc.) with a set of replacement links. The set of replacement links may include fewer links than the series of chained links.

The method may also include executing one or more transfers according to the consolidated database. The one or more transfers may be based on the replacement links. For example, if a replacement link connects entity A to entity B and is associated with an amount of $1000, the method may include executing a transfer of $1000 from entity A to entity B. Moreover, if the link is associated with a time window (i.e., a deadline for executing the transfer), the method may include executing the transfer within the time window.

In some embodiments of the method, the database may be implemented as a graph database. Implementing the database as a graph database may include representing each entity from the plurality of entities as a node in the graph database, and representing each link as an edge in the graph database. The edge may connect the node that represents the sender entity of the link to the node that represents the recipient entity of the link.

In certain embodiments, the consolidation may follow multiple models. One model may be followed when the series of links connects one entity, e.g., entity A, to another entity, e.g., entity B. In this scenario, the consolidating may include replacing the series of links with the set of replacement links, and the set of replacement links may include a single link that connects entity A to entity B.

Another model may be followed when the series of links connects an entity, e.g., entity C, back to the same entity C. In this scenario, the consolidating may include replacing the series of links with the set of replacement links, and the set of replacement links may include a result of a difference function applied to the series of links. The difference function may be designed to produce a net transfer from the series of links. For example, the difference function may subtract the amount associated with the link leading out of Node C from the amount of the link leading into Node C. The result may be the net transfer flow, and the replacement link may be assigned the amount of the result. When the result is below a predetermined threshold amount, e.g., if the series of edges nets out to zero (or 1 cent, or $1, or any other suitable predetermined threshold), the series of links may cancel out, and the set of replacement links may reduce to a null set.

In certain embodiments, the method may further include associating each transfer request with a time window. The consolidating may further include adhering to the time window when replacing the series of links with the set of replacement links. The method may also include associating the time window with an incentive value, and the amount of the incentive value may be based at least in part on the size of the time window.

In some embodiments of the method, the plurality of entities may include a mesh of trusted entities. A mesh of trusted entities may be a network of entities that achieve a level of trust vis-à-vis all other entities in the network. The method may further include compiling the plurality of entities, via an artificial intelligence ("AI") module, from a master list of entities.

In certain embodiments of the method, the consolidating may be invisible to the plurality of entities. The entities may submit transfer requests, and may prefer not to be inundated with details of how the transfers are carried out. These embodiments may provide the entities with a seamless platform for conducting transfers that consolidates the transfers to reduce resource costs, while streamlining the process by masking the details of the transfers.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to digital transfers. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to digital transfers.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
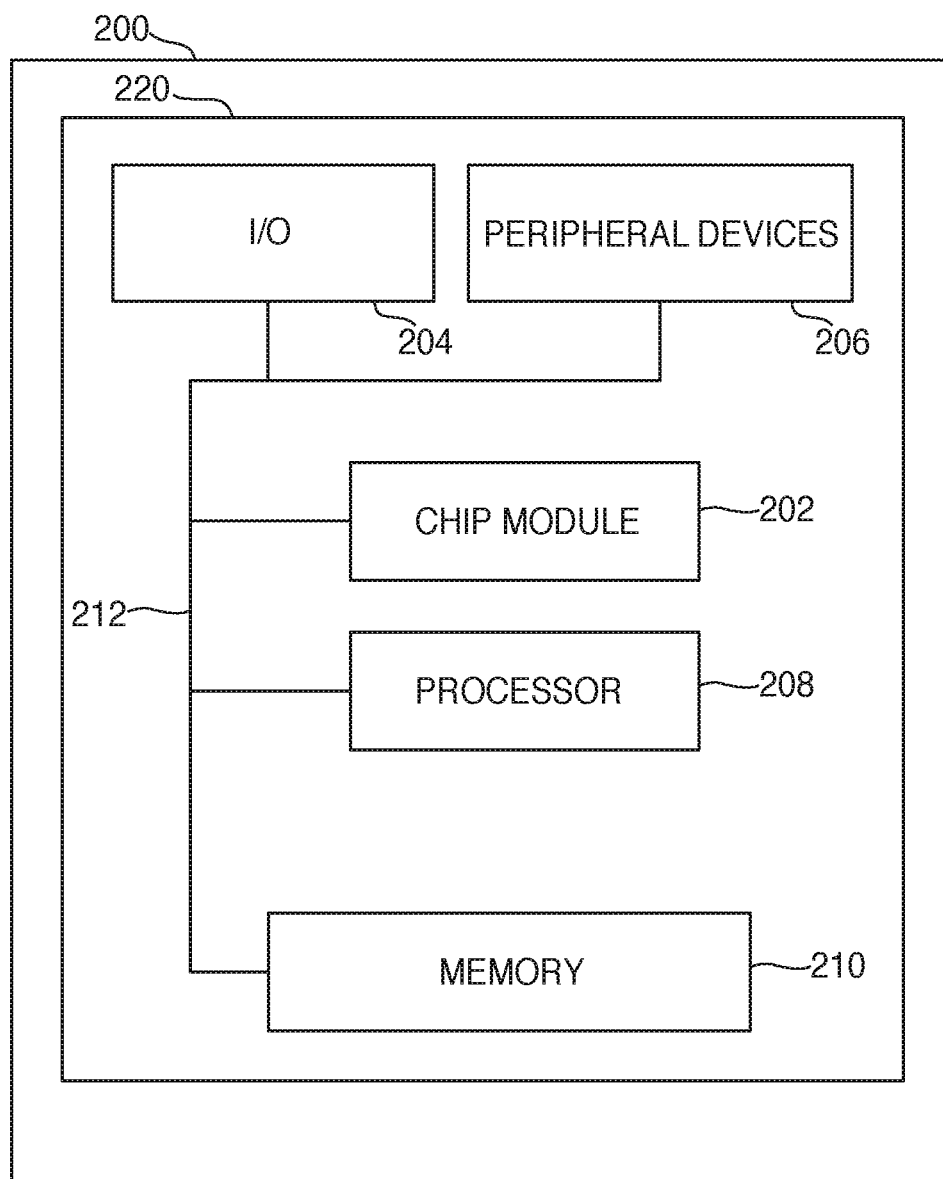
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
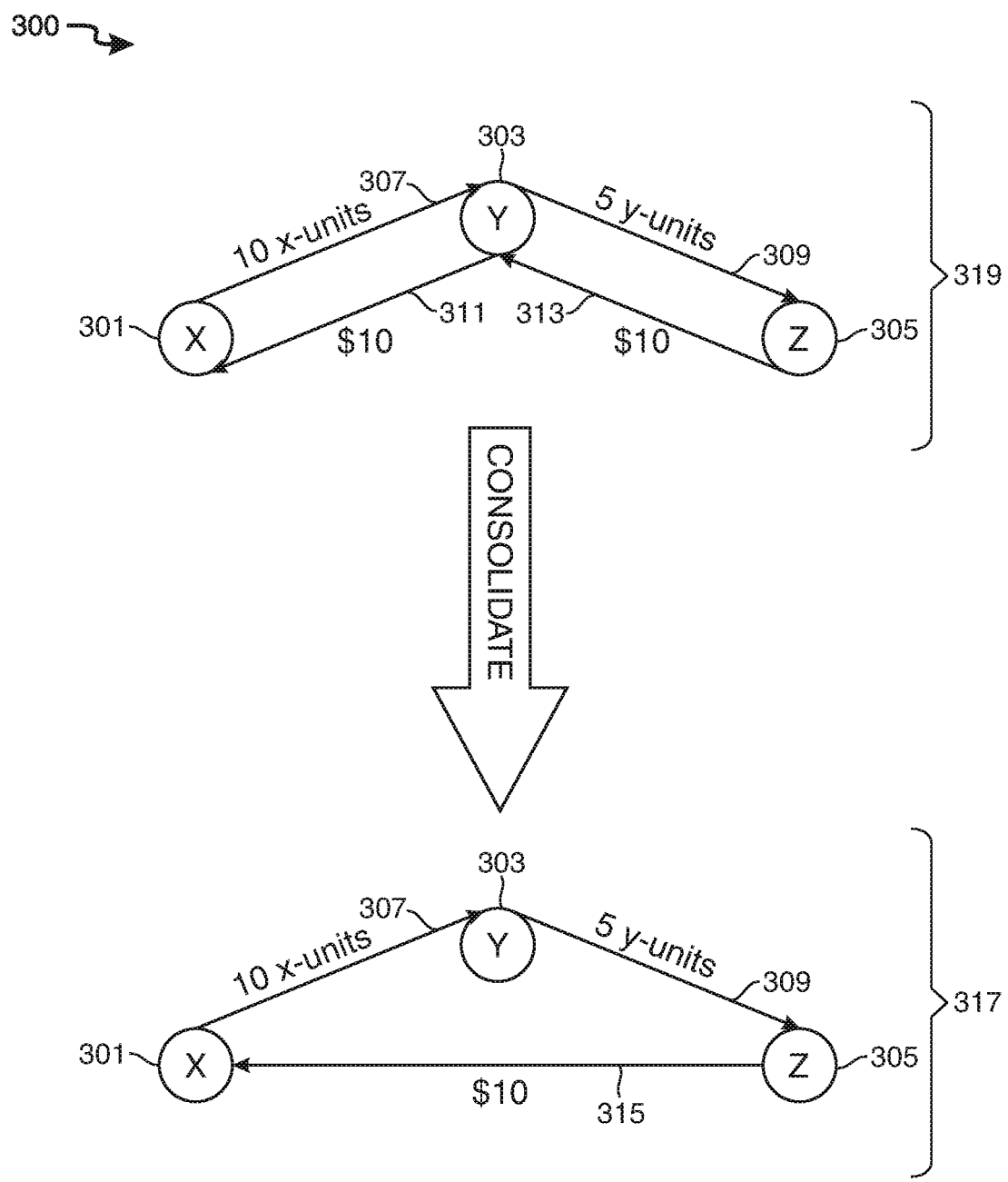
FIG. 3 shows an illustrative process in accordance with principles of the disclosure.

FIG. 3 shows illustrative process 300 for providing a consolidated transfer system in accordance with aspects of the disclosure. Process 300 may show a portion of a database. The database may be a graph database. The graph database may include Node X (301), Node Y (303) and Node Z (305). Each node may represent an entity. The entities may form all or part of a network of entities.

Edge 307 may connect Node X (301) with Node Y (303) and may represent that Node X (301) is scheduled to transfer 10 units of a product x to Node Y (303). Edge 311 may connect Node Y (303) with Node X (301) and may represent that Node Y (303) is scheduled to transfer $10 to Node X (301). The transfer of edge 311 may constitute payment for the transfer of edge 307.

Edge 309 may connect Node Y (303) with Node Z (305) and may represent that Node Y (301) is scheduled to transfer 5 units of a product y to Node Z (305). Edge 313 may connect Node Z (305) with Node Y (303) and may represent that Node Z (305) is scheduled to transfer $10 to Node Y (303). The transfer of edge 313 may constitute payment for the transfer of edge 307.

The system may traverse the database and determine that edges 313 and 311 form a series of edges with a multi-hop path. (Edges 307 and 309, although also a series of edges with a multi-hop path, may not qualify for consolidation since the contents of the transfer—i.e., units of x and units of y—belong to different categories, and may not be eligible for consolidation.) The system may proceed to consolidate the graph database by replacing edges 313 and 311 with a single replacement edge 315, which connects Node Z (305) with Node X (301). The system may then proceed to execute the transfer represented by replacement edge 315 of the consolidated database, and transfer $10 from Node Z (305) to Node X (301). Executing the transfer according to consolidated database 317 rather than original database 319 may reduce resource costs and improve efficiency.

Figure 4:
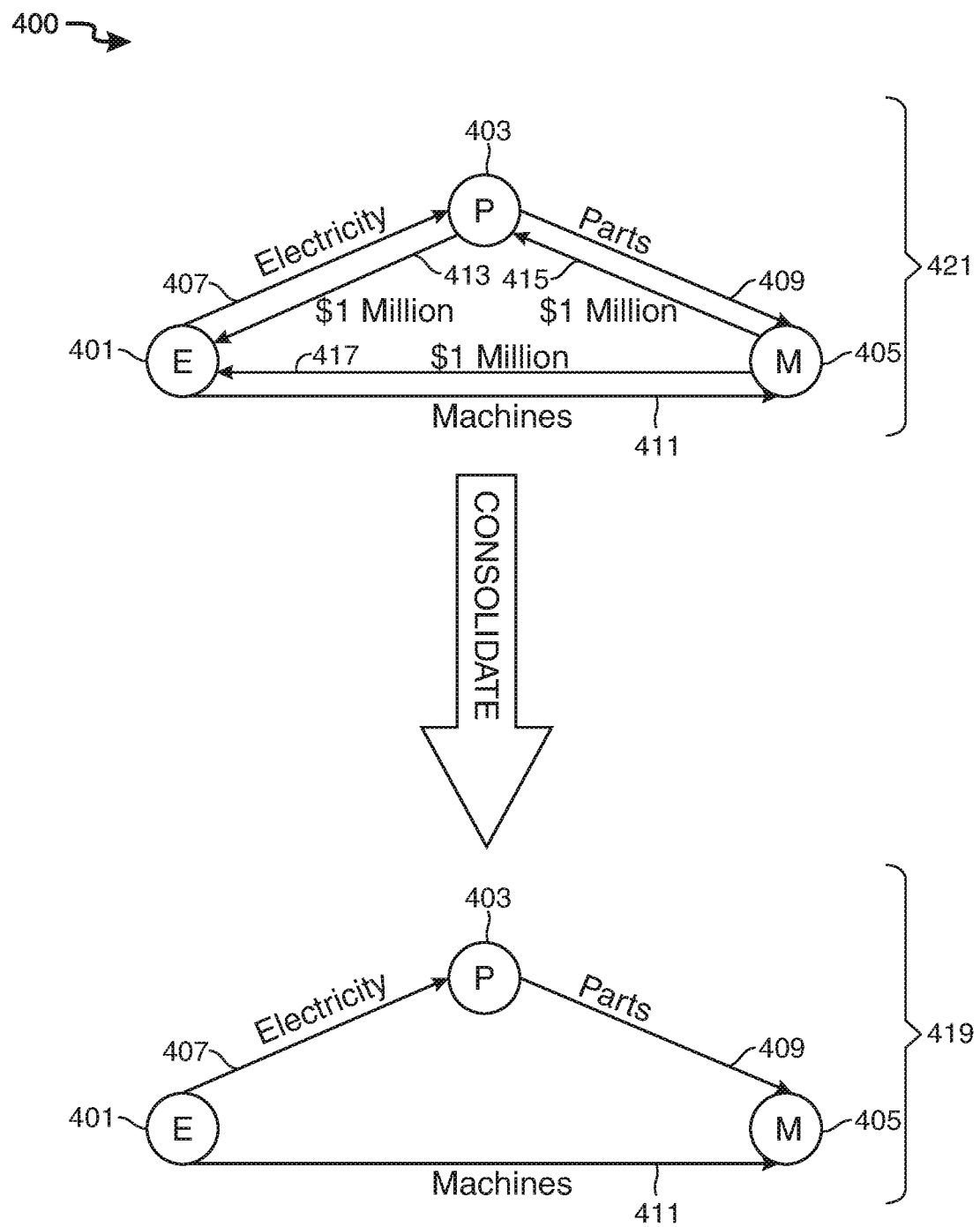
FIG. 4 shows another illustrative process in accordance with principles of the disclosure.

FIG. 4 shows illustrative process 400 for providing a consolidated transfer system in accordance with aspects of the disclosure. Process 400 may show a portion of a database. The database may be a graph database. The graph database may include Node E (401), Node P (403) and Node M (405). Each node may represent an entity from a network of entities. In this example, Node E (401) may be an entity that supplies electricity, Node P (403) may be an entity that supplies parts, and Node M (405) may be an entity that supplies machines.

Edge 407 may connect Node E (401) with Node P (403) and may represent that Node E (401) is scheduled to transfer a certain amount of electricity to Node P (403). Edge 413 may connect Node P (403) with Node E (401) and may represent that Node P (403) is scheduled to transfer $1 million to Node E (401). The transfer of edge 413 may constitute payment for the transfer of edge 407.

Edge 409 may connect Node P (403) with Node M (405) and may represent that Node P (403) is scheduled to transfer a certain amount of parts to Node M (405). Edge 415 may connect Node M (405) with Node P (403) and may represent that Node M (405) is scheduled to transfer $1 million to Node P (403). The transfer of edge 415 may constitute payment for the transfer of edge 409.

Edge 411 may connect Node M (405) with Node E (401) and may represent that Node M (405) is scheduled to transfer a certain amount of machinery to Node E (401). Edge 417 may connect Node E (401) with Node M (405) and may represent that Node E (401) is scheduled to transfer $1 million to Node M (405). The transfer of edge 417 may constitute payment for the transfer of edge 411.

The system may traverse the database and determine that edges 413, 415, and 417 form a series of edges with a multi-hop path. (Edges 407, 409, and 411, although also a series of edges with a multi-hop path, may not qualify for consolidation since the items of the transfers—i.e., electricity, parts, and machinery—belong to different categories, and may not be eligible for consolidation.) Moreover, the series of edges forms a loop, and a difference function may determine that the net transfer of the loop is $0. As such, the series of edges may cancel out, and the system may consolidate the graph database by removing edges 413, 415, and 417. Executing the transfers according to consolidated database 419 rather than original database 421 in this scenario may involve only the transfer of goods—i.e., the transfers of edges 407, 409, and 411—without any monetary transfers. Eliminating the monetary transfers may reduce resource costs and improve the efficiency of the system.

In certain embodiments, the database may be configured to store only one category transfer content. For example, the database may only show monetary transfers. In other embodiments, a system may maintain an array of databases, and each database may be dedicated to one category of transfer content.

Figure 5:
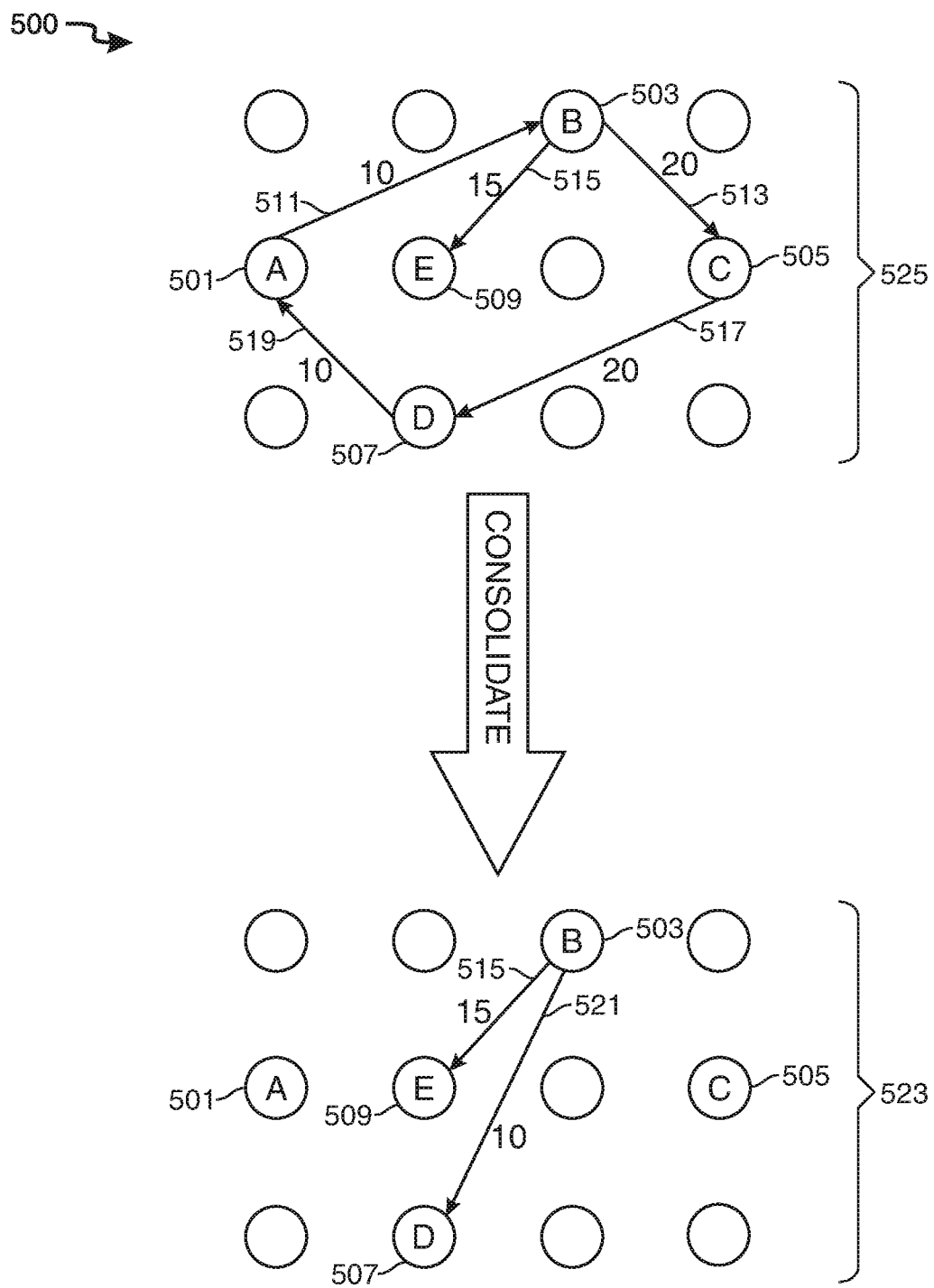
FIG. 5 shows another illustrative process in accordance with principles of the disclosure.

FIG. 5 shows illustrative process 500 for providing a consolidated transfer system in accordance with aspects of the disclosure. Process 500 may show a portion of a database. The database may be a graph database. The graph database may include Node A (501), Node B (503), Node C (505), Node D (507), and Node E (509), among other nodes in the database. Each node may represent an entity from a network of entities.

Edge 511 connects Node A (501) and Node B (503) with an amount of 10, Edge 513 connects Node B (503) and Node C (505) with an amount of 20, Edge 515 connects Node B (503) and Node E (509) with an amount of 15, Edge 517 connects Node C (505) and Node D (507) with an amount of 20, and Edge 519 connects Node D (507) and Node A (501) with an amount of 10.

The system may traverse the database and determine that edges 511, 513, 517, and 519 form a series of edges with a multi-hop path. The series of edges also forms a loop. The system may proceed to consolidate the graph database by replacing edges 511, 513, 517, and 519 with a single replacement edge 521 that connects Node B (503) and Node D (507) with an amount of 10. Executing the transfer according to consolidated database 523 rather than original database 525 may reduce resource costs and improve efficiency.

Consolidating the database with replacement edge 521 may be the result of a computation via a difference function. The difference function may determine the result by computing the net transfer flow of the edges in the system. In the scenario portrayed in process 500, the consolidation may follow any one of multiple routes and arrive at the same conclusion. For example, one route may begin by consolidating the loop consisting of edges 511, 513, 517, and 519. The loop may be further simplified into 2 opposing series—edges 519 and 511 in one direction and edges 513 and 517 in the other. Edges 519 and 511 can be consolidated into a single edge connecting Node D to Node B in the amount of 10, and edges 513 and 517 can be consolidated into a single edge connecting Node B to Node D in the amount of 20. Those two opposing edges can in turn be consolidated into a single replacement edge (521) connecting Node B to Node D in the amount of 10. Alternative routes, such as routes obtained by consolidating pairs of connected edges in alternative sequences, may yield the same determination, and result in the same, or operationally the same, consolidated database 523.

Figure 6:
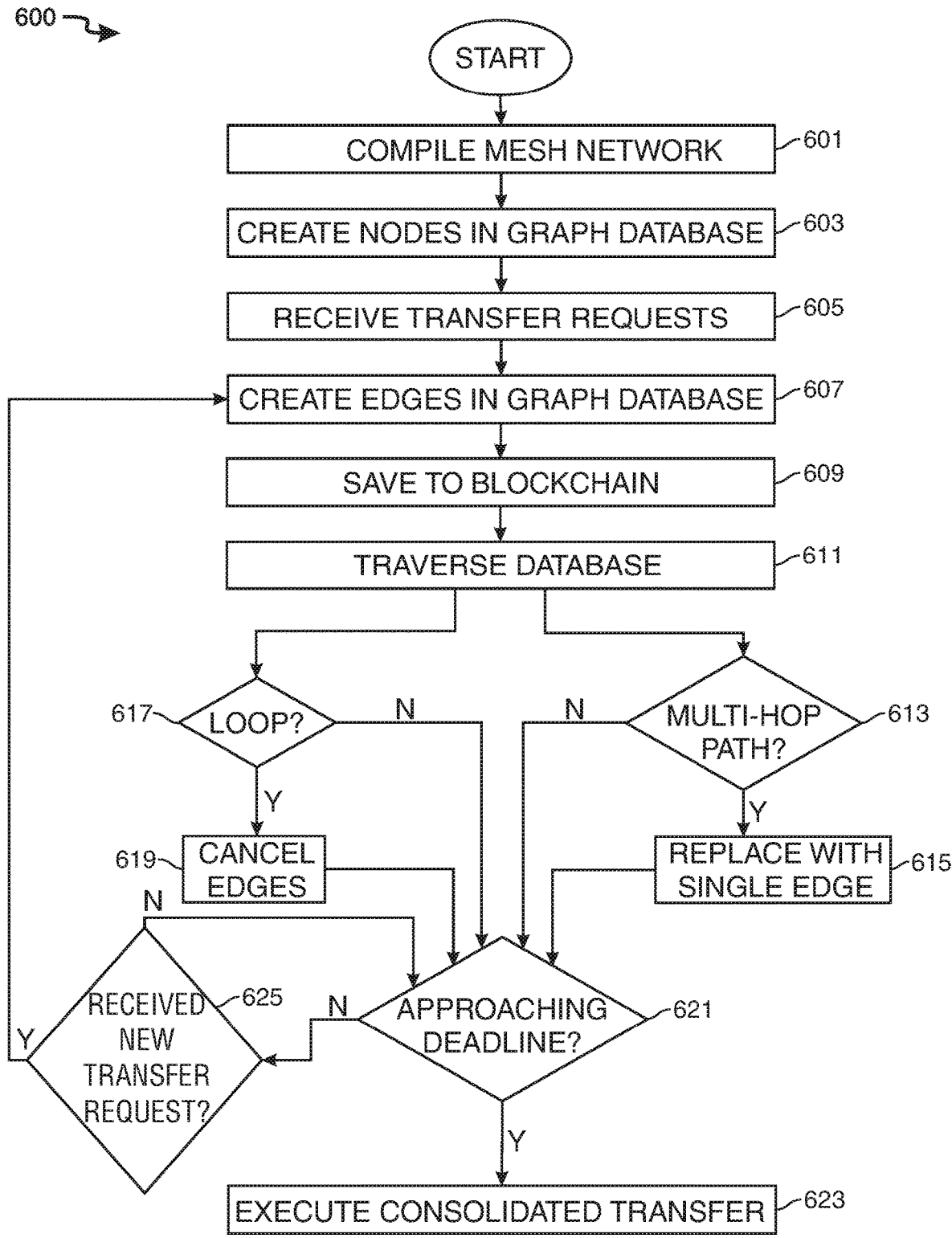
FIG. 6 shows an illustrative flowchart in accordance with principles of the disclosure.

FIG. 6 shows illustrative flowchart 600 of a logic flow for providing a consolidated transfer system in accordance with aspects of the disclosure. Flowchart 600 shows one exemplary embodiment—other embodiments may include different steps and/or sequences than shown in flowchart 600.

Flowchart 600 begins with step 601, compiling a mesh network of entities. Compiling the mesh network may involve reducing a master list of entities. The master list may, in some embodiments, be a client list of an umbrella entity (e.g., a financial institution that may facilitate digital transfers). In other embodiments the master list may be a list of entities that applied or opted-in to be part of the consolidated transfer system.

Reducing the master list may include determining a group of entities that achieved a level of trust in relation to one another. Reducing the master list may include removing a group of entities that failed to achieve a level of trust in relation to one another. The level of trust may, in certain embodiments, be achieved through successfully transacting (one time or a predetermined number of times) with each other. A level of trust may also be achieved through any other criteria, such as a rating by a third-party auditor.

At step 603, the system may create nodes in a database to correspond to the mesh network of entities. The database may be a graph database. At step 605, the system may receive transfer requests. Each transfer request may include a sending entity, a recipient entity, a transfer type, a transfer amount, and/or a time window for execution. At step 607, the system may create edges in the graph database to correspond to the transfer requests. At step 609, the database may be saved to a distributed ledger or blockchain. The distributed ledger may include multiple blockchain nodes for saving coordinated copies of the database. The blockchain nodes may include computer systems associated with the entities in the mesh network.

At step 611, the system may traverse the database. Traversing the database may include processing and analyzing the edges in the database to find connected edges, or a pair of edges wherein one leads into a node and the other leads out of the same node. If a series of nodes with a multi-hop path is determined at step 613, the system may consolidate the database by replacing the series of edges with a single replacement edge at step 615. If a loop of edges (i.e., a series of edges that loops back to a starting node) is determined at step 617, the system may cancel the edges of the loop at step 619. Alternatively, if a difference function applied to the loop determines that the net transfer flow of the loop is above a predetermined threshold amount (e.g., $0, or any other suitable threshold such as $0.01, $0.05, $0.10, $1, or other), the system may replace the loop of edges with replacement edges that correspond to the net transfer flow determined by the difference function.

At step 621, the system may determine if any deadlines (i.e., expiring time windows) are approaching in the consolidated database. If a deadline is approaching, the system may execute the consolidated transfer at step 623.

If no deadlines are approaching, the system may determine if any new transfer requests were received at step 625. If a new transfer request was received, the system may loop back to step 607, create new edges in the database, and proceed from there. If no new transfer requests were received, the system may again determine if any deadlines are approaching at step 621. The system may wait to execute any transfers until the deadline approaches, because new transfer requests may still be received that may allow for a consolidation, and therefore facilitate a reduction in resource utilization of the transfers.

Figure 7:
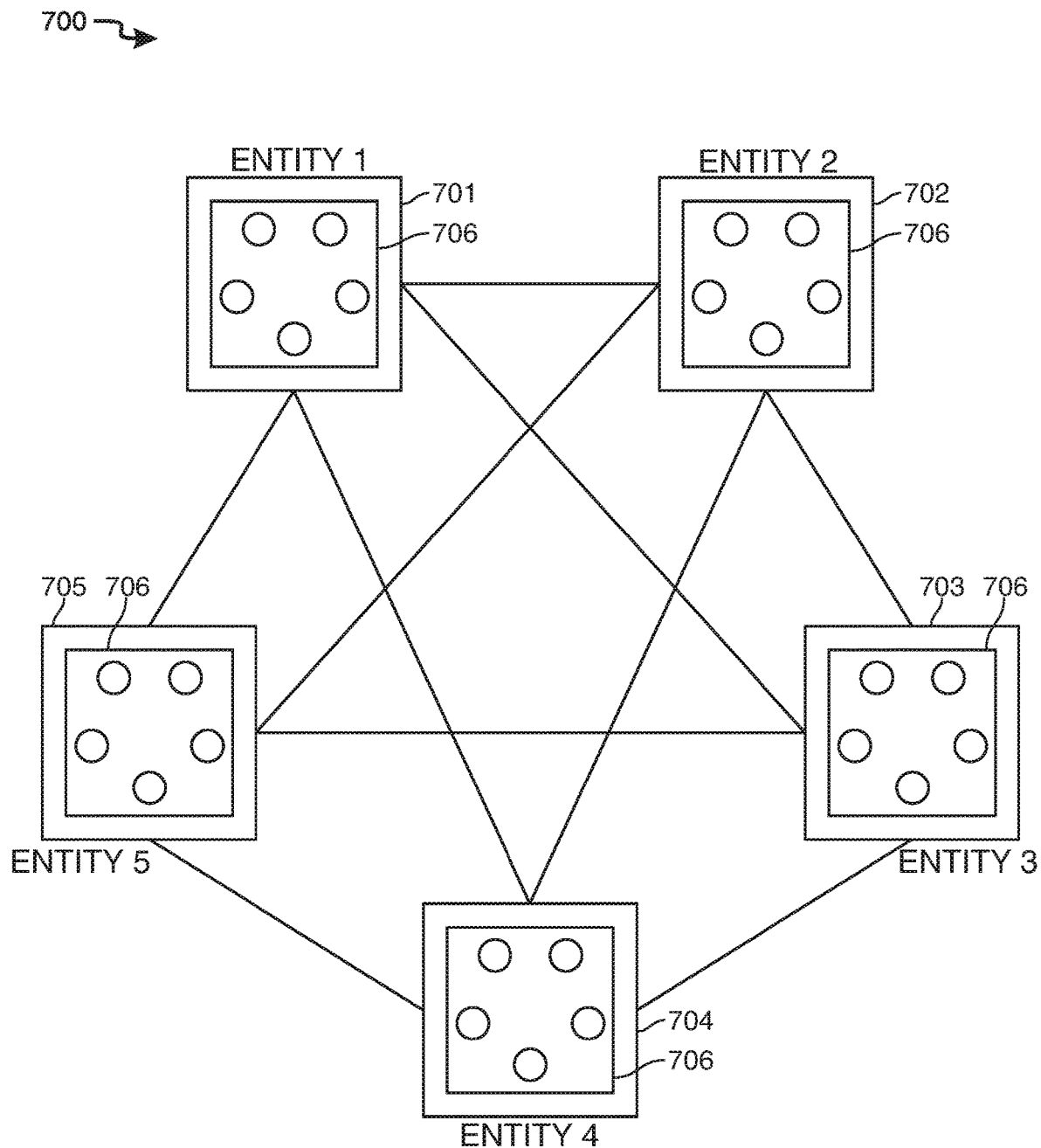
FIG. 7 shows an illustrative architecture in accordance with principles of the disclosure.

FIG. 7 shows illustrative architecture 700 for providing a consolidated transfer system in accordance with aspects of the disclosure. Architecture 700 shows one exemplary embodiment—other embodiments may include different elements and/or arrangements than shown in architecture 700.

Architecture 700 shows a mesh network of entities 1-5 (701-705). The mesh network is completely interconnected to show that each entity may have achieved a level of trust vis-à-vis the other entities in the network. The mesh network of entities may be represented as nodes in graph database 706. Architecture 700 shows that, in some embodiments, database 706 may be implemented as a distributed ledger, and may be stored on each of entities 1-5 (701-705).

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for a consolidated transfer matrix are provided. Persons skilled in the art will appreciate that the present invention can be practiced by other than the described embodiments, which are presented for purposes of illustration rather than of limitation, and that the present invention is limited only by the claims that follow.

What is claimed is:

1. A computer-based method for providing a consolidated transfer matrix, the method comprising:
   creating a plurality of nodes in a graph database that is stored in a computer memory, each node corresponding to one of a plurality of entities;
   receiving a transfer request, the transfer request comprising a sender entity, a recipient entity, a type of content to transfer, and an amount of the content to transfer;
   creating an edge in the graph database corresponding to the transfer request, the edge connecting a first node to a second node wherein the first node corresponds to the sender entity and the second node corresponds to the recipient entity, and the edge is associated with the type and the amount;
   receiving one or more additional transfer requests;
   creating another edge in the graph database for each of the additional transfer requests;
   traversing the graph database;
   consolidating the graph database, said consolidating comprising replacing a series of edges, said series of edges that form a multi-hop path and are associated with a common type, with a set of replacement edges, said set of replacement edges that are associated with the common type and form a path with fewer hops than the multi-hop path; and
   executing one or more transfers according to the consolidated graph database.

2. The method of claim 1, wherein, when the multi-hop path of the series of edges connects a node A to a node B, the set of replacement edges comprises a single edge that connects the node A to the node B.

3. The method of claim 1, wherein, when the multi-hop path of the series of edges connects a node C back to said node C, the set of replacement edges comprises a result of a difference function applied to the series of edges, and, when the result is below a predetermined threshold amount, the set of replacement edges reduces to a null set.

4. The method of claim 1, wherein the plurality of entities comprises a mesh of trusted entities, wherein each entity in the plurality of entities comprises a level of trust vis-à-vis all other entities in the plurality of entities.

5. The method of claim 1, further comprising compiling the plurality of entities, via an artificial intelligence ("AI") module, from a master list of entities.

6. The method of claim 1, further comprising associating each transfer request with a time window, said time window that comprises a maximum timeframe within which to execute the transfer, and the consolidating further comprises adhering to the time window when replacing the series of edges with the set of replacement edges.

7. The method of claim 6, further comprising associating the time window with an incentive value, wherein the amount of the incentive value is based at least in part on the size of the time window, and the incentive value corresponds to a value awarded to the receiving entity for extending the time window.

8. The method of claim 1, wherein the consolidating is invisible to the plurality of entities.

9. The method of claim 1, further comprising implementing the graph database as a distributed ledger.

10. The method of claim 9, wherein the distributed ledger comprises a plurality of blockchain nodes, and the plurality of blockchain nodes comprise a plurality of computer systems associated with the plurality of entities.

11. A computer system for providing a consolidated transfer matrix, the system comprising:
   a graph database stored in a memory unit, said graph database comprising:
      a plurality of nodes, each node corresponding to one of a plurality of entities; and
      a plurality of edges, each edge that:
         connects a first node to a second node; and
         corresponds to a transfer request, said transfer request that is received by the system and comprises:
            a type of content to transfer;
            an amount of the content to transfer;
            a sending entity that corresponds to the first node; and
            a receiving entity that corresponds to the second node; and
   a consolidation engine comprising computer code running on a processor, wherein the consolidation engine is configured to:
      traverse the graph database;
      consolidate the graph database, said consolidation comprising replacing a series of edges, said series of edges that form a multi-hop path and are associated with a common type, with a set of replacement edges, said set of replacement edges that are associated with the common type and form a path with fewer hops than the multi-hop path; and
      execute one or more transfers according to the consolidated graph database.

12. The system of claim 11, wherein:
   when the multi-hop path of the series of edges connects a node A to a node B, the set of replacement edges comprises a single edge that connects the node A to the node B; and
   when the multi-hop path of the series of edges connects a node C back to said node C, the set of replacement edges comprises a result of a difference function applied to the series of edges, and, when the result is below a predetermined threshold amount, the set of replacement edges reduces to a null set.

13. The system of claim 11, wherein each transfer request is associated with a time window, said time window that comprises a maximum timeframe within which to execute the transfer, and the consolidation engine is further configured to:
   adhere to the time window when replacing the series of edges with the set of replacement edges; and
   associate the time window with an incentive value, wherein the amount of the incentive value is based at least in part on the size of the time window, and the incentive value corresponds to a value awarded to the receiving entity for extending the time window.

14. The system of claim 11, wherein:
   the graph database is implemented as a distributed ledger;
   the distributed ledger comprises a plurality of blockchain nodes; and
   the plurality of blockchain nodes comprise a plurality of computer systems associated with the plurality of entities.

15. A computer-based method for providing a consolidated transfer matrix, the method comprising:
   storing a plurality of entities in a database, said database that is implemented as a distributed ledger, wherein the distributed ledger comprises a plurality of blockchain nodes, and the plurality of blockchain nodes comprise a plurality of computer systems associated with the plurality of entities;
   receiving a transfer request, the transfer request comprising a sender entity, a recipient entity, a type of content to transfer, and an amount of the content to transfer;
   storing the transfer request as a link in the database;
   receiving one or more additional transfer requests;
   storing the additional transfer requests as additional links in the database;
   consolidating the database, said consolidating comprising replacing a series of chained links with a set of replacement links, wherein said series of chained links are associated with a common type and said set of replacement links is also associated with the common type and comprises fewer links than the series of chained links; and
   executing one or more transfers according to the consolidated database.

16. The method of claim 15, wherein:
   the database is a graph database;
   each entity from the plurality of entities is represented as a node in the graph database; and
   each link is represented as an edge in the graph database, wherein the edge connects the node that represents the sender entity of the link to the node that represents the recipient entity of the link.

17. The method of claim 15, wherein:
   when the series of links connects an entity A to an entity B, the set of replacement links comprises a single link that connects the entity A to the entity B; and
   when the series of links connects an entity C back to said entity C, the set of replacement links comprises a result of a difference function applied to the series of links, and, when the result is below a predetermined threshold amount, the set of replacement links reduces to a null set.

18. The method of claim 15, further comprising:
   associating each transfer request with a time window, said time window that comprises a maximum timeframe within which to execute the transfer, and the consolidating further comprises adhering to the time window when replacing the series of links with the set of replacement links; and
   associating the time window with an incentive value, wherein the amount of the incentive value is based at least in part on the size of the time window, and the incentive value corresponds to a value awarded to the receiving entity for extending the time window.

19. The method of claim 15, wherein the plurality of entities comprises a mesh of trusted entities, wherein each entity in the plurality of entities comprises a level of trust vis-à-vis all other entities in the plurality of entities; and
   the method further comprises compiling the plurality of entities, via an artificial intelligence ("AI") module, from a master list of entities.

20. The method of claim 15, wherein the consolidating is invisible to the plurality of entities.

\* \* \* \* \*